Patented Dec. 11, 1934

1,983,562

UNITED STATES PATENT OFFICE 1,983,562

ANTHRAQUINONE - SELENAZOLES AND PROCESS OF PREPARING SAME

Melvin A. Perkins, Milwaukee, Wis., and Oakley Maurice Bishop, deceased, late of Wilmington, Del., by Eva P. Bishop and Wilmington Trust Company, Wilmington, Del., executors, assignors to E. I. du Pont de Nemours & Company, Wilmington, Del., a corporation of Delaware No Drawing. Application August 1, 1932, Serial No. 627,223

21 Claims. (Cl. 260—44)

This invention relates to vat dyestuffs. More particularly, this invention deals with dyestuffs of the anthraquinone-selenazole series.

In copending application, Serial No. 627,222 we have described novel selenium compounds of the anthraquinone series characterized by containing at least one anthraquinone nucleus possessing a selenium atom in an alpha position and an amino group in position ortho thereto. Our present invention deals with the conversion of these products to the corresponding selenazoles.

We have found that said ortho-amino-selenoanthraquinone compounds react readily with organic acyl chlorides or with organic aldehydes to produce novel compounds characterized by possessing in their structure, in addition to the anthraquinone nucleus, a five membered ring containing 1 nitrogen atom and 1 selenium atom. The novel compounds contain in their structure the following atomic configuration:

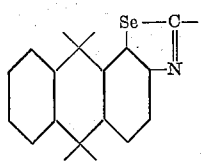

and because of the analogy of this configuration to that characteristic of anthraquinone-1,2-thiazoles, we have designated the novel compounds as anthraquinone-1,2-selenazoles; the digits 1,2 referring respectively to the positions of the selenium atom and nitrogen atom with respect to the anthraquinone nucleus.

We have further found that, with a few exceptions, the novel compounds thus produced constitute valuable vat dyestuffs, dyeing cotton in greenish yellow to orange shades of excellent fastness properties.

It is accordingly an object of this invention to produce novel compounds of the anthraquinone series characterized by possessing at least one selenazole ring built on to the two carbon atoms in positions 1 and 2 of the anthraquinone nucleus.

It is a further object of this invention to produce novel vat dyestuffs of the anthraquinone series dyeing cotton in greenish yellow to orange shades of excellent fastness qualities.

It is a further object of this invention to devise an efficient and economically practical method for carrying the aforementioned objects into effect.

Other and further important objects of this invention will appear as the description proceeds.

In our present invention we start with a 2-amino-1-seleno-anthraquinone compound as described in copending application Serial No. 627,-222. This initial material may be 2-amino-anthraquinone-1-selenol itself, or its alkali-metal salts; that is, the selenolates. We may also start with the salts formed by reacting upon the amino group, for instance the sulfate of 2-amino-anthraquinone-1-selenol. Finally, we may start with the corresponding leuco-derivatives, or on the contrary, with the diselenide derivatives obtained by mild oxidation of said selenols or selenolates. The last mentioned compounds are particularly suitable where the sulfuric acid process, using an aldehyde, is to be followed, in accordance with procedure (2) as set forth below.

If it is desired to produce an anthraquinone-selenazole substituted in the nucleus by simple substituents such as halogen or methyl groups, the corresponding nuclearly substituted 2-amino-anthraquinone-1-selenols or selenolates may be selected as initial material.

This initial material may then be converted into the corresponding selenazole by reacting with an "azolating agent", that is, a compound of type

wherein R is a hydrogen atom, an alkyl, aryl or aralkyl residue, X is a hydrogen or halogen atom, and Y is an oxygen atom or two halogen atoms.

It will be noted that this definition includes bodies typified by benzo-trichloride, benzal-chloride, benzoyl-chloride and benzaldehyde. In the group of aldehydes this definition includes the free aldehydes, as well as addition and polymerization products of these, typified by aldehyde-bisulfite addition products and trioxymethylene respectively. In other words, this definition includes bodies which under the conditions of reaction as more fully set forth below decompose to liberate the free aldehyde.

The reaction may be effected in one of two ways: (1) The material may be suspended in an anhydrous organic liquid such as nitrobenzene or dichlorobenzene and reacted with an acyl halide, or (2) it may be suspended or dissolved in sulfuric acid and reacted with an aldehyde. In many cases the reaction readily begins at ordinary temperatures and proceeds of its own accord for the greater part of the conversion. For the sake, however, of insuring complete reaction, it is advantageous to heat the reaction mass slowly and maintain it at an elevated temperature for some time. In the case of the acyl halide procedure, this temperature is preferably at about or near the reflux temperature of the mixture. In the case of the aldehyde procedure, temperatures of 50 to 90° C. will suffice.

As already indicated, it is preferable to start with the diselenide in the aldehyde procedure, and with the selenolate in the acyl halide procedure; however, these rules need not be strictly adhered to.

The products of the above reaction are compounds of the general formula:

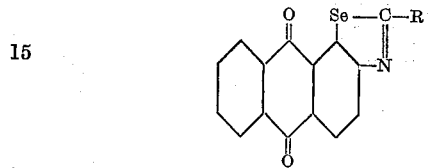

wherein R has the same significance as above, namely, it may stand for hydrogen, alkyl, aryl or arolkyl, depending on the "azolating agent" selected. If desired, an azolating agent may be selected which has two azolating groups, namely one of the general formula:

wherein R stands for an alkylene, arylene or aralkylene residue or nothing at all, while X stands for hydrogen or halogen, and Y stands for oxygen or two halogens. In the limiting case wherein R stands for nothing, the above formula reduces to

and represents the simple compounds, hexachlorethane, tetrachlorethane, oxalyl chloride, glyoxal and derivatives of the latter, such as glyoxal sulfate. In cases of this general type, the resulting compound contains two anthraquinone-selenazole groupings and may be represented by the general formula:

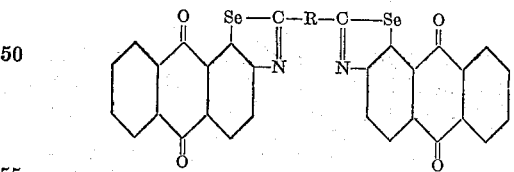

Aside from the freedom of selection in the nature of R, the azolating agent may be selected from a number of compounds which are adapted to react with primary amines to give either imides or Schiff's bases. To the former class belong the acyl halides such as the acyl chlorides or bromides. To the latter class belong the aldehydes and compounds which contain the group

typified by benzal chloride and benzotrichloride. To the latter class belong further aldehyde addition or polymerization products, as typefied by aldehyde-bisulfite, aldehyde-ammonia, aldehyde-acetal, trioxy-methylene, and glyoxal-sulfate. This group is characterized by the common property of liberating the free aldehyde when dissolved in sulfuric acid.

As specific instances of various azolating agents suitable for our invention, the following may be mentioned:

Terephthalyl chloride
Iso-phthalyl chloride
Terephthalyl-o-benzoyl-chloride
Trimesic-acid-chloride
Diphenyl-4,4'-dicarboxylic acid chloride
Oxalyl chloride
Adipyl chloride
Malonyl chloride
Succinyl chloride
Benzaldehyde
Terephthal-aldehyde
Glyoxal sulfate
Formaldehyde and a number of others.

All of these ring close successfully and most of them yield vat dyestuffs dyeing cotton in shades lying between greenish yellow and orange. As vat dyestuffs, the compounds containing two anthraquinone-selenazole groups are generally superior to the mono-anthraquinone-selenazoles.

The mono-selenazoles prepared from the simpler aliphatic aldehydes such as formaldehyde (or the corresponding acyl chlorides) are useful as intermediates for dyestuffs.

Without limiting our invention to any particular procedure, the following examples, in which parts by weight are given, will serve to illustrate our preferred mode of operation.

*Example 1*

648 parts of 2-amino-anthraquinone-1-sodium-selenolate (2 mols) as prepared, for instance, according to Example 1 of copending application, Ser. No. 627,222, are suspended in 7800 parts of dry nitrobenzene, and 203 parts of terephthalyl-chloride (1 mol) are added. The blue solid rapidly disappears and is replaced by small yellow particles and orange needles. The mixture is now slowly warmed to about 180° C. and maintained at that temperature for four hours, during which time it turns green. The dyestuff suspension thus produced is filtered while still hot and the cake washed with alcohol and hot water. After drying the dyestuff forms a yellow-green powder which may be purified by fractional crystallization from sulfuric acid, by vatting, or by treatment with oxidizing agents such as sodium hypochlorite.

The purified product is a yellow solid, giving a yellow solution in concentrated sulfuric acid, and a brownish violet hydrosulfite vat from which cotton is dyed in strong, greenish-yellow shades.

The product most probably corresponds to the following formula:

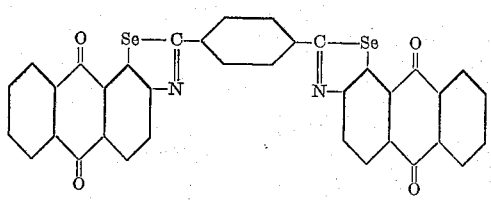

*Example 2*

To a solution of 10 parts of 2,2'-diamino-1,1'-dianthraquinonyl-diselenide (prepared for instance by mild oxidation of 2-amino-anthraquinone-1-sodium-solenolate) in 100 parts of 66° Bé. sulfuric acid are added 3.5 parts of benzaldehyde. The solution at once warms itself up, reaching about 50° C. Sulfur dioxide is evolved. The mixture is now heated to 90° C. for 10 minutes to complete the reaction, after which it is allowed to cool and is drowned in water to precipitate the greenish dyestuff. The dyestuff may be further purified by treatment with hypochlorite solution and forms a bright greenish-yellow powder when dry. It yields a greenish yellow coloration in concentrated sulfuric acid solution and an intensely colored claret vat from which cotton is dyed a very greenish yellow.

The product of this example is most probably an omega-phenyl-1,2-anthraquinone-selenazole of the following formula:

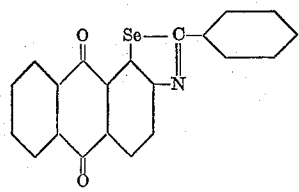

Example 3

50 parts of 2,2'-diamino-1,1'-dianthraquinonyl-diselenide are dissolved in 500 parts of concentrated sulfuric acid. To the solution are added 12 parts of terephthal-aldehyde and the reaction is allowed to proceed without external application of heat. After about ten minutes, the mass has heated itself to about 50° C. and the dyestuff has largely separated from solution in the form of bright yellow needles. Additional quantities of dyestuff may be crystallized out by partially diluting the mass with water. Alternatively, the dyestuff may be obtained in a fine state of subdivision by adding 500 parts of 100% sulfuric acid, thereby effecting complete solution, and subsequently drowning in water. The product is a yellow powder which is practically pure, directly as obtained. Its constitution is apparently the same as that of the product obtained in Example 1. The yield is practically quantitative.

Example 4

10 parts of 2,2'-diamino-1,1'-dianthraquinonyl-diselenide are dissolved in 100 parts of 66° Bé. sulfuric acid. 4 parts of glyoxal sulfate crystals are added, and the mixture is warmed to 85–90° C. for twenty minutes. Vigorous evolution of sulfur dioxide occurs during this stage. The solution is then cooled, and the dyestuff is isolated either by drowning in water or by partial dilution of the sulfuric acid solution, followed by filtration. The product is suitable for use directly or may be further purified, as for example, by the usual bichromate or hypochlorite treatment. It gives exceptionally strong, bright, greenish-yellow dyeings and is remarkably well adapted for use in printing textile fabric.

Its structure most probably corresponds to the following formula:

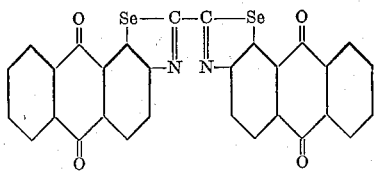

Example 5

100 parts of the sodium salt of 2-amino-anthraquinone-1-selenol are suspended in 1200 parts of dry o-dichlorobenzene and treated with 20 parts of oxalyl chloride at room temperature. After one-half hour, the mixture is gradually warmed to 50–60° C., held at that temperature one-half hour, and then gradually heated to reflux and boiled until no further change occurs. This requires about three hours. The product, which is a dark powder, may be purified by the usual methods and yields a dyestuff similar to that of Example 4.

Example 6

648 parts of 2-amino-anthraquinone-1-sodium-solenolate (2 mols) are added to a solution of 183 parts of adipyl chloride (1 mol) in 7800 parts of nitrobenzene. The mixture is heated very slowly to the boil, passing through a gray stage at 150–180° C., and is refluxed for three hours. The mixture is filtered at 120° C. and the dark solid worked up as usual. The dyestuff yields a brown vat from which cotton is dyed a yellowish orange.

Example 7

100 parts of 2-amino-3-chloro-anthraquinone-1-sodium-selenolate are suspended in 1000 parts of dry nitrobenzene, and a solution of 29 parts of terephthalyl chloride in 200 parts of nitrobenzene is added over the course of one-half hour. The mixture becomes orange in color and the greenish blue particles of the selonolate rapidly disappear. The mixture is heated gradually to 150° C. at which temperature the orange color is displaced by a dark green, and the mass thickens. The mixture is maintained at 150° C. for four hours, then filtered hot and worked up as in the preceding examples.

The purified dyestuff, which is a chlorine substitution derivative of the dyestuff obtained in Example 1, gives a yellow solution in sulfuric acid, and dyes cotton from a violet vat in strong greenish yellow colors slightly redder in shade than those of the unsubstituted compound.

This chlorinated color exhibits also good printing qualities.

Example 8

717 parts of 2-amino-3-chloro-anthraquinone-1-sodium-selenolate (2 mols) are suspended in 7800 parts of dry nitrobenzene, and 279 parts of diphenyl-4,4'-dicarboxylic acid chloride (1 mol) are added.

The mixture is gradually heated to about 200° C. The mass becomes thick and green in color. After one hour of boiling, the nitrobenzene suspension of the dyestuff is cooled to 120° C., filtered and worked up as usual. After purification, the dyestuff forms an orange paste which gives orange yellow dyeings from a violet vat.

Example 9

100 parts of 2,2'-diamino-3,3'-dichloro-1,1,-di-anthraquinonyl-diselenide are dissolved in 1000 parts of 66° Bé. sulfuric acid, and 36 parts of glyoxal sulfate are added. The mixture is gently warmed and held at 90° C. for fifteen minutes, during which period sulfur dioxide is evolved. At the end of this time, the mixture is allowed to cool, diluted with water, and the precipitated dyestuff is filtered off. It forms a yellow powder similar to the product of Example 4, and gives bright greenish-yellow dyeings from a brownish-violet vat.

Its structure most probably corresponds to the formula:

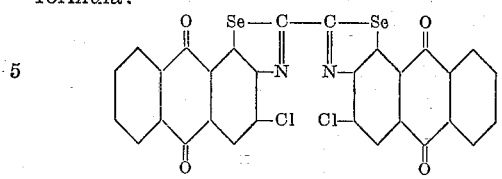

Example 10

203 parts of terephthalyl chloride (1 mol) are added slowly to a suspension of 806 parts of 2-amino-3-bromo-1-anthraquinone-sodium-selenolate (2 mols) in 10,000 parts of dry nitrobenzene. The charge is then slowly heated. The suspension first becomes orange in color; then, at about 175° C., it darkens and becomes green. After refluxing for three hours, when no further change is to be observed, the dyestuff suspension is cooled slightly and filtered, washed successively with alcohol and water, and dried. The bromide-containing dyestuff thus obtained forms a greenish powder which may be purified by the usual methods and yields yellow dyeings of a somewhat more orange shade than the chlorine-containing or unsubstituted products of Examples 7 and 1, respectively.

It will be understood that many variations and modifications are possible in the preferred procedure above set forth, without departing from the spirit of this invention. Thus, although we preferred to work with stoichiometric proportions in each of the above examples, the success of the invention is not dependent upon this feature. The reaction will proceed with an excess of one or the other of the reagents, although of course, in this case some unreacted material is likely to remain over and contaminate the main product. Similarly, the success of the reaction is not dependent on the exact order of addition or mixing of the reactants.

In the aldehyde condensation, we preferred to use 66° Bé. sulfuric acid. However, other concentrations of this acid between 83 and 100% may be used, water or an organic solvent being employed as diluent. Below 83%, the diselenide of 2-amino-anthraquinone is not readily soluble in the sulfuric acid and therefore the reaction does not proceed so fast; nevertheless such suspensions in dilute sulfuric acid are workable, as will be readily understood to those skilled in the art.

We claim:

1. A vat dyestuff of the anthraquinone series comprising a compound of the general formula:

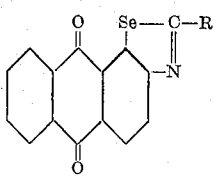

wherein R is an organic radical.

2. A compound of the anthraquinone series possessing the following general formula:

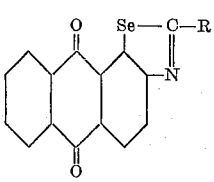

wherein R is an alkyl or aryl group, or an organic radical including another anthraquinone-1,2-selenazole grouping.

3. A compound of the anthraquinone series possessing the following general formula:

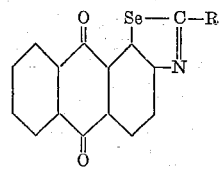

wherein R is an alkyl or aryl group.

4. A compound of the anthraquinone series possessing the following general formula:

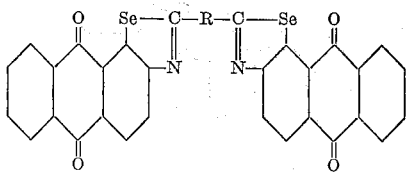

wherein R represents an alkylene, arylene or aralkylene group or a bond connecting the two carbon atoms of the respective selenazole rings.

5. A vat dyestuff consisting essentially of a bis-(anthraquinone-selenazole) compound of the following formula:

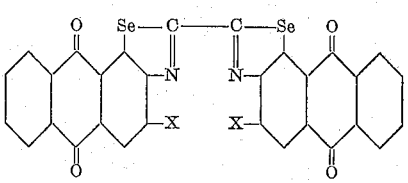

wherein X stands for hydrogen or halogen.

6. The process of preparing a 1,2-anthraquinone-selenazole compound which comprises reacting a 2-amino-1-seleno-anthraquinone compound with an azolating agent of the general formula

wherein R stands for a hydrogen atom or an organic radical, X stands for a hydrogen or halogen atom and Y stands for an oxygen or two halogen atoms.

7. The process of preparing a 1,2-anthraquinone-selenazole compound which comprises reacting a 2-amino-1-seleno-anthraquinone compound with an azolating agent selected from the group consisting of organic acyl-halides, organic aldehydes, and compounds behaving like aldehydes when in acid solution.

8. The process of preparing a vat dyestuff which comprises reacting upon a 1-seleno-2-amino-anthraquinone compound with a compound of the general formula

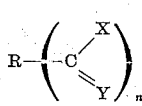

wherein R stands for an alkyl or aryl radical, X stands for hydrogen or halogen, Y stands for oxygen or two halogens, and $n$ stands for the number 1 or 2.

9. The process of preparing a vat dyestuff which comprises reacting upon a 1-seleno-2- amino-anthraquinone compound with a compound of the general formula $$R{-}\left(\!O{-}C\!\!\begin{array}{c}{\scriptstyle\nearrow O}\\{\scriptstyle\searrow Cl}\end{array}\!\right)_{\!n}$$

wherein R stands for an alkyl or aryl radical, and $n$ stands for 1 or 2.

10. The process of preparing a vat dyestuff which comprises reacting upon a 1-seleno-2-amino-anthraquinone compound with a compound of the general formula $$R{-}\left(\!O{-}C\!\!\begin{array}{c}{\scriptstyle\nearrow O}\\{\scriptstyle\searrow H}\end{array}\!\right)_{\!n}$$

wherein R stands for an alkyl or aryl radical, and $n$ stands for 1 or 2.

11. The process of preparing a vat dyestuff which comprises reacting upon a 2-amino-anthraquinone-1-alkali-metal-selenolate compound with an organic acid halide in an inert, organic medium.

12. The process of preparing a vat dyestuff which comprises reacting upon a 2,2'-diamino-1,1'-dianthraquinonyl-diselenide with an organic aldehyde in a sulfuric acid medium.

13. The process of preparing a vat dyestuff which comprises reacting upon a 2,2'-diamino-1,1'-dianthraquinonyl-diselenide with an organic aldehyde in concentrated sulfuric acid.

14. The process of preparing a vat dyestuff which comprises reacting upon a 2,2'-diamino-1,1'-dianthraquinonyl-diselenide of the general formula:

wherein X stands for hydrogen or halogen, with a glyoxal compound in a sulfuric acid medium.

15. The process of preparing a vat dyestuff which comprises reacting upon a 2,2'-diamino-1,1'-dianthraquinonyl-diselenide of the general formula:

wherein X stands for hydrogen or halogen, with glyoxal sulfate in a sulfuric acid medium.

16. A compound of the anthraquinone series possessing the following general formula:

wherein R stands for an alkyl group, an aryl group, a group of the general formula:

or a group of the general formula:

wherein $R_1$ stands for an alkyl or aryl group, and wherein any of the above anthraquinone nuclei may carry further substituents.

17. A compound of the anthraquinone series containing a selenazole ring, the latter being attached to the anthraquinone nucleus, and so disposed with respect thereto that the selenium atom is attached in an alpha position while the nitrogen atom is attached in a beta position ortho to the selenium atom.

18. A compound of the anthraquinone-1,2-selenazole series.

19. Anthraquinone-1,2-C-phenyl-selenazole.

20. C,C-phenylene-bis (anthraquinone-1,2-selenazole).

21. C,C-bis (anthraquinone-1,2-selenazole).

MELVIN A. PERKINS.
EVA P. BISHOP,
WILMINGTON TRUST CO.,
By ELWYN EVANS,
Vice President,
Executors of the Estate of Oakley Maurice Bishop, Deceased.